(12) United States Patent
Du

(10) Patent No.: US 12,670,811 B2
(45) Date of Patent: Jun. 30, 2026

(54) METHOD FOR MANUFACTURING A LESION TISSUE PROSTHESIS THAT SIMULATES PROTEIN PROPERTIES, A LESION TISSUE PROSTHESIS AND A MEDICAL PROSTHESIS

(71) Applicant: NATIONAL CHENG KUNG UNIVERSITY, Tainan City (TW)

(72) Inventor: Yi-Chun Du, Tainan City (TW)

(73) Assignee: Lyson Medical Technology Co., Ltd., Tainan City (TW)

( * ) Notice: Subject to any disclaimer, the term of this patent is extended or adjusted under 35 U.S.C. 154(b) by 270 days.

(21) Appl. No.: 18/737,134

(22) Filed: Jun. 7, 2024

(65) Prior Publication Data

US 2025/0006081 A1 Jan. 2, 2025

(30) Foreign Application Priority Data

Jun. 29, 2023 (TW) ................................ 112124328

(51) Int. Cl.
| | |
|---|---|
| *G09B 23/00* | (2006.01) |
| *C08J 3/24* | (2006.01) |
| *C08K 3/26* | (2006.01) |
| *G09B 23/28* | (2006.01) |

(52) U.S. Cl.
CPC .............. *G09B 23/286* (2013.01); *C08J 3/24* (2013.01); *C08K 3/26* (2013.01); *C08J 2333/02* (2013.01); *C08K 2003/262* (2013.01)

(58) Field of Classification Search
CPC ....... G09B 23/286; C08J 3/24; C08J 2333/02; C08K 3/26; C08K 2003/262
See application file for complete search history.

(56) References Cited

U.S. PATENT DOCUMENTS

| | | | | |
|---|---|---|---|---|
| 2013/0289690 A1* | 10/2013 | Thapliyal | ................. | A61F 2/88 |
| | | | | 53/425 |
| 2016/0310303 A1* | 10/2016 | Thapliyal | ................. | A61F 2/90 |

* cited by examiner

*Primary Examiner* — Jamel E Williams
(74) *Attorney, Agent, or Firm* — Rosenberg, Klein & Lee

(57) ABSTRACT

A method for manufacturing a lesion tissue prosthesis that simulates protein properties is provided, which includes steps of: adding sodium carbonate and sodium polyacrylate to a first deionized water to obtain a first mixture; adding a cross-linking agent to the first mixture, and waiting for the cross-linking agent to be completely dissolved; and adding an initiator and an accelerator to the first mixture, stirring to form a viscous colloid, and then shaping the viscous colloid to form a lesion tissue prosthesis. A medical prosthesis is also provided, which is formed by a normal tissue prothesis made of an elastic colloid that covers or adheres to the lesion tissue prosthesis.

14 Claims, 8 Drawing Sheets

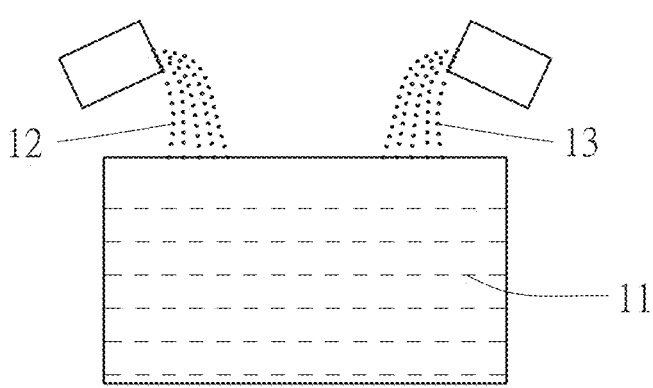
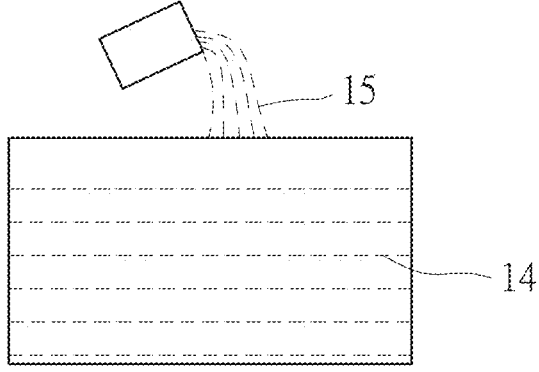
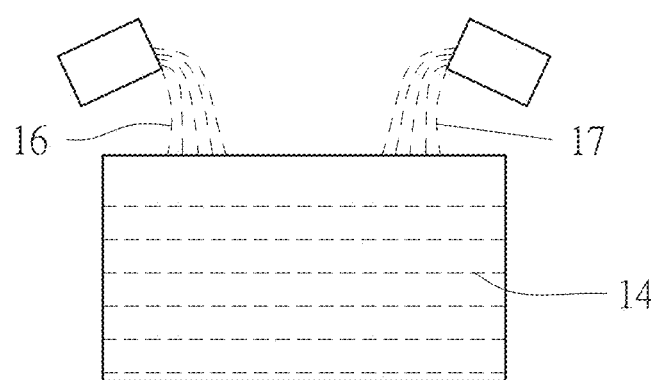
F I G . 1

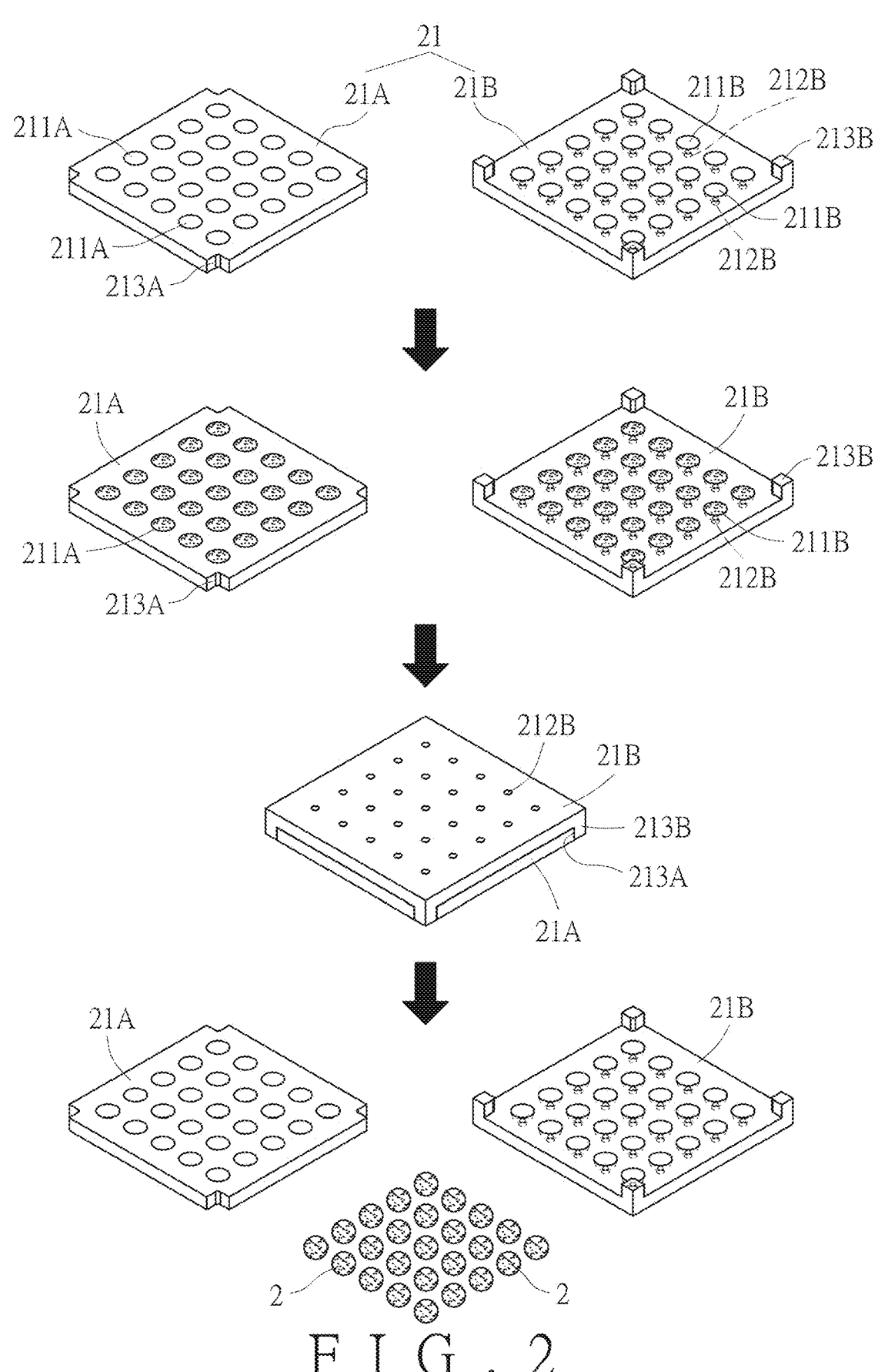
F I G . 2

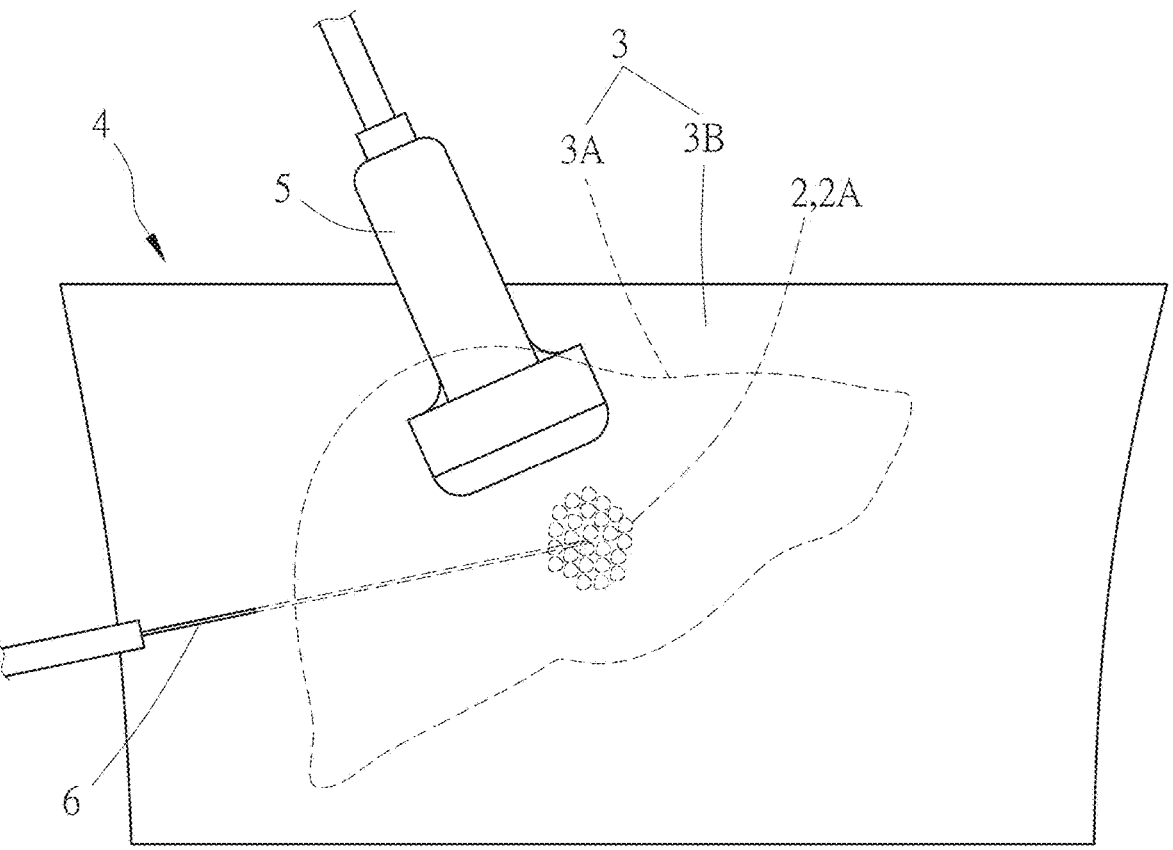
F I G . 4

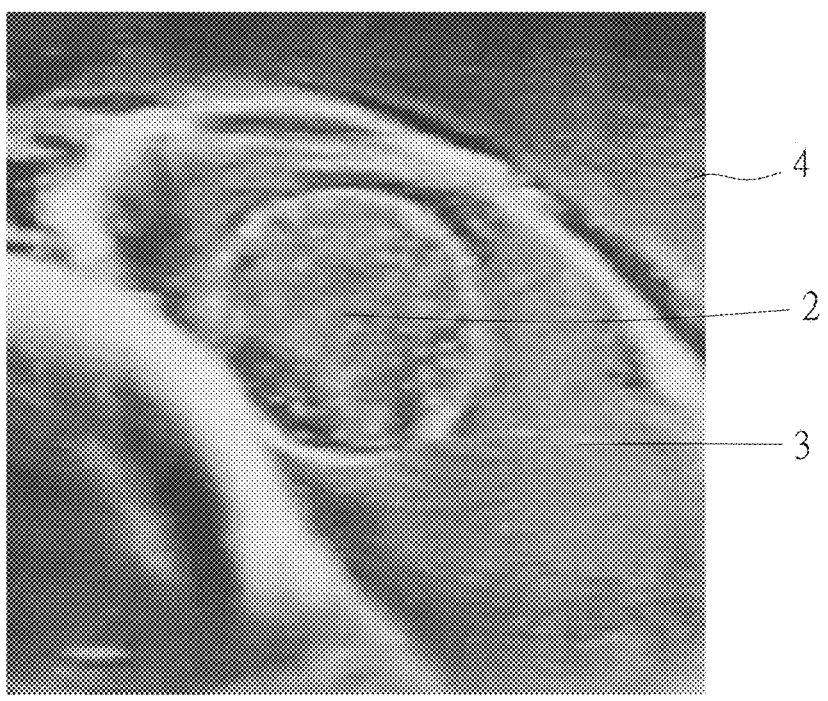
F I G . 5A
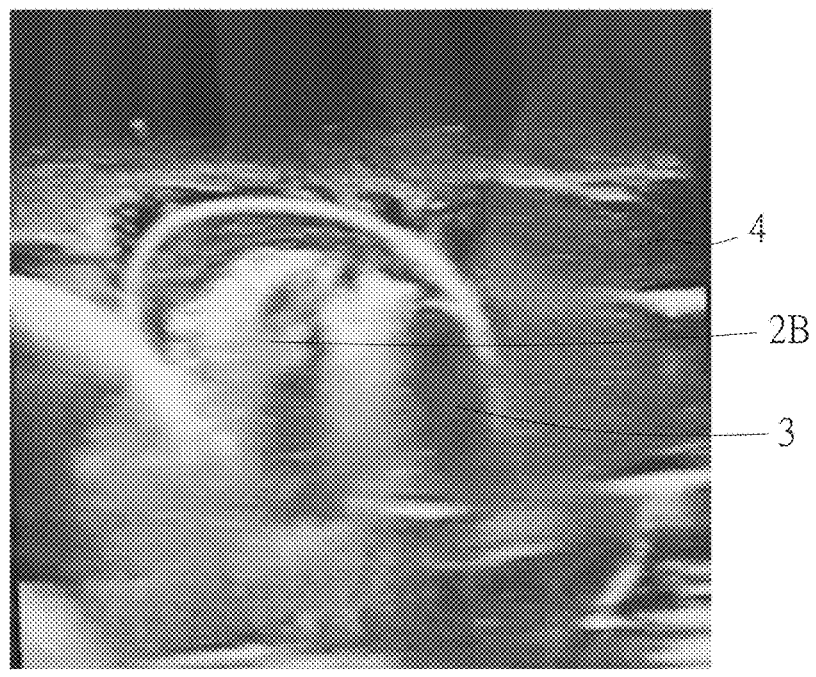
F I G . 5B

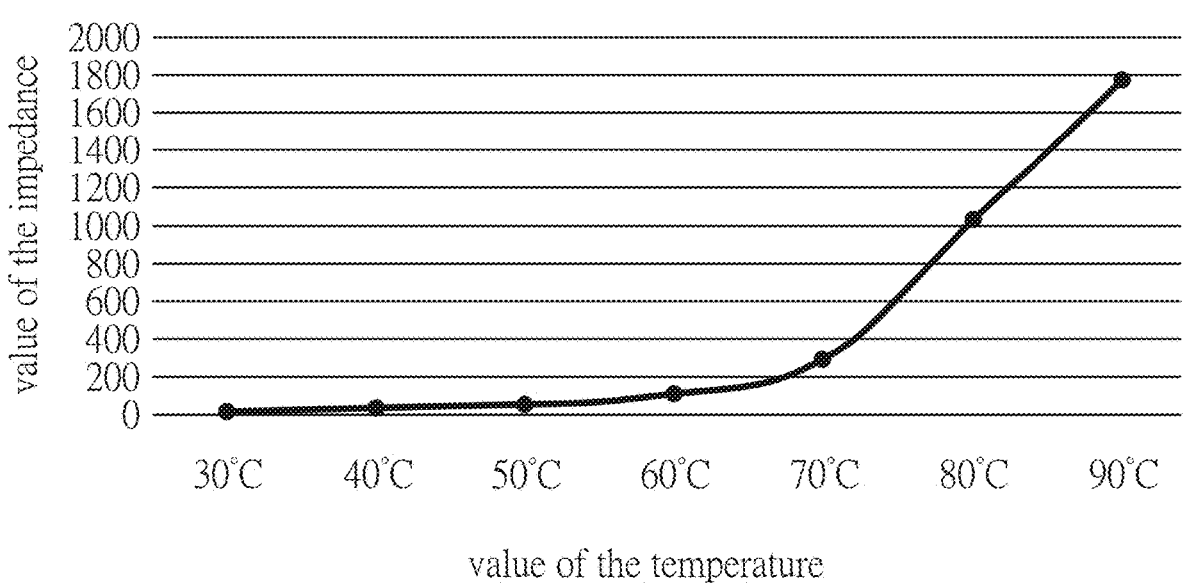
F I G . 6

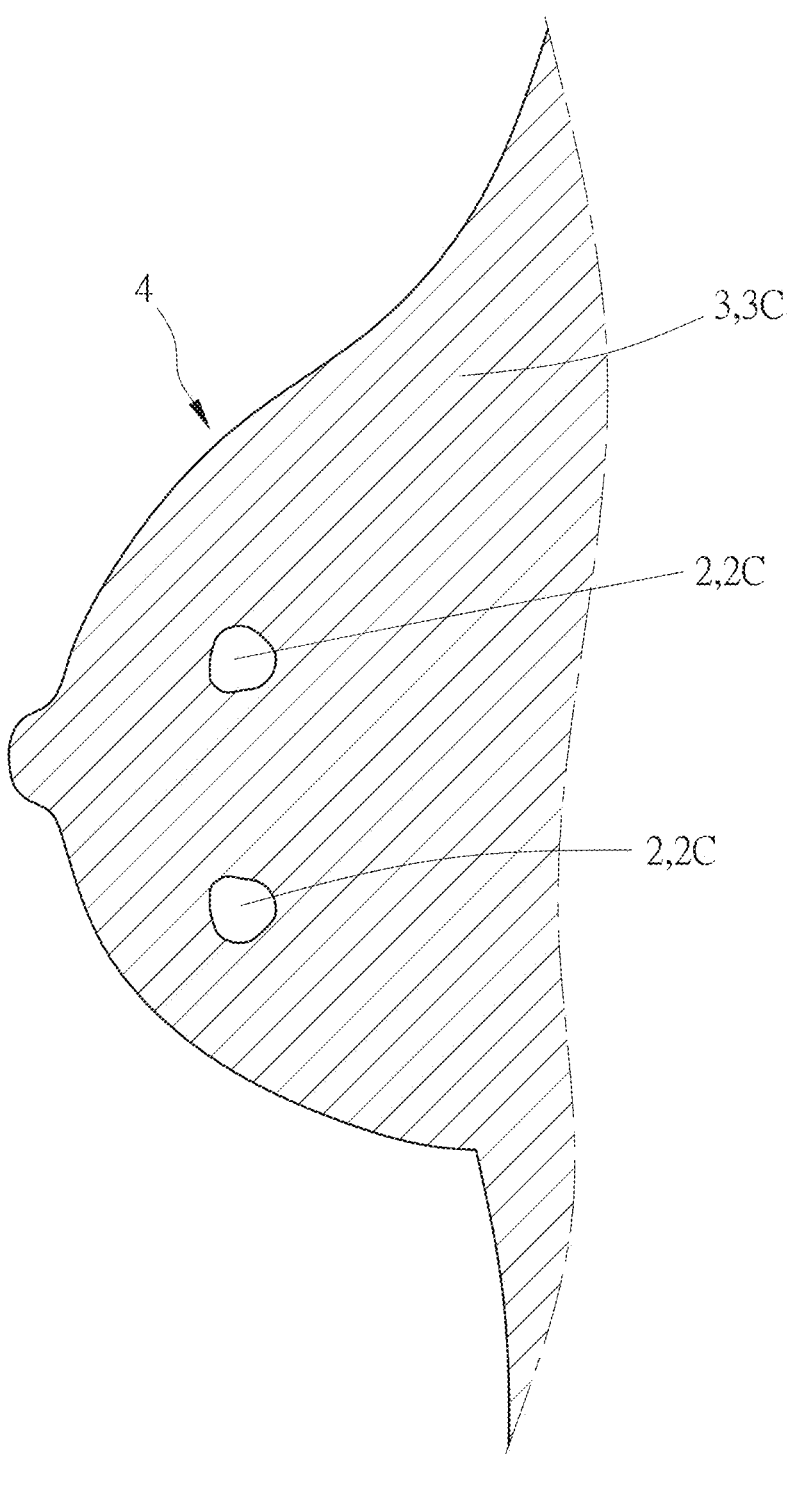
F I G . 7

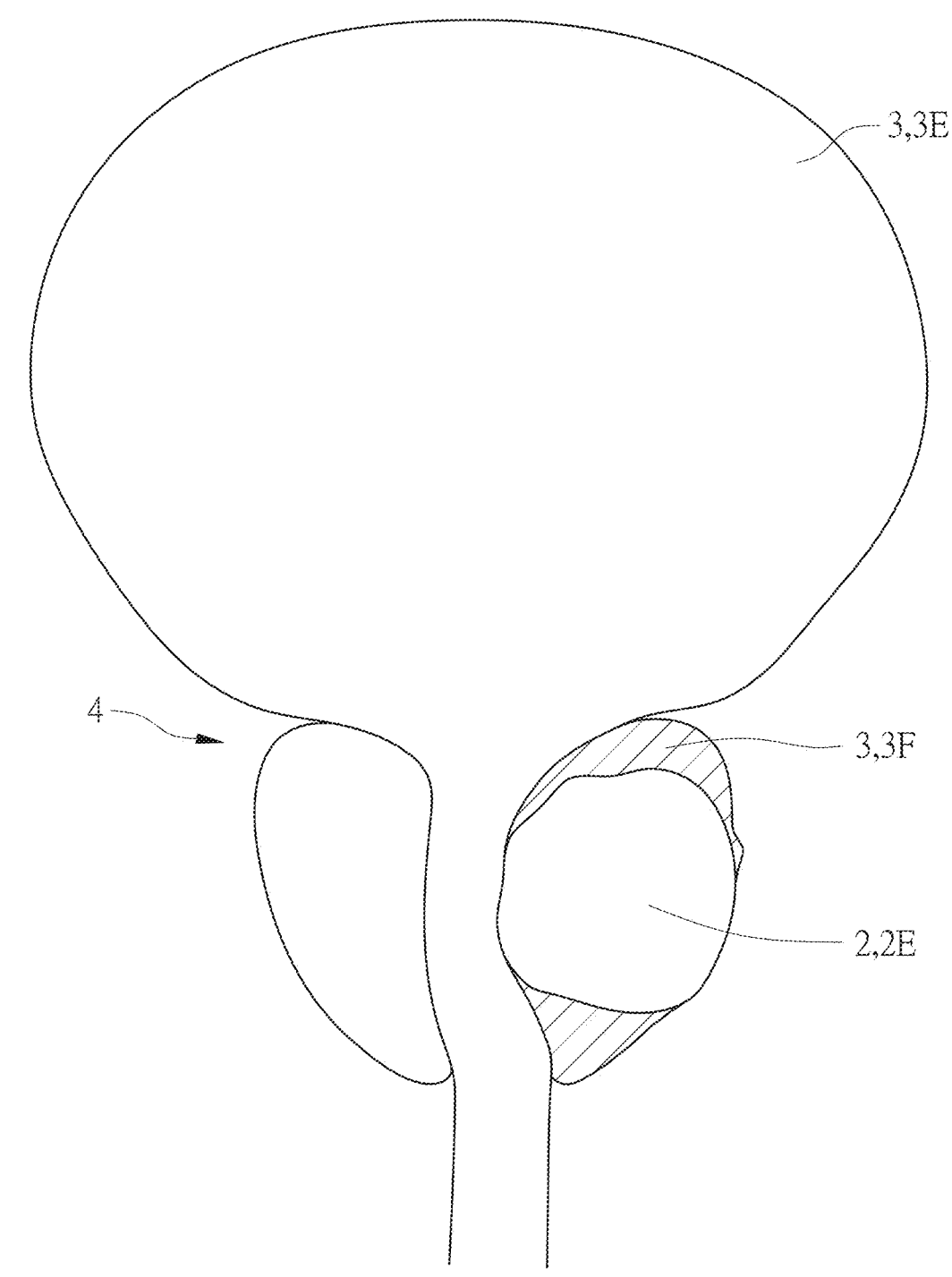
F I G . 8

METHOD FOR MANUFACTURING A LESION TISSUE PROSTHESIS THAT SIMULATES PROTEIN PROPERTIES, A LESION TISSUE PROSTHESIS AND A MEDICAL PROSTHESIS

TECHNICAL FIELD

The present disclosure relates to a manufacturing method of a lesion tissue prosthesis that simulates protein properties, a lesion tissue prosthesis and a medical prosthesis. The lesion tissue prosthesis manufactured according to the manufacturing method of the present disclosure is a soft elastomer at room temperature, and can be solidified by simulating protein properties according to the operating temperature of thermal ablation, showing a highly realistic effect of the lesion tissue after thermal ablation.

BACKGROUND OF RELATED ARTS

Tumor is a type of lesion tissue. For the treatment of tumors, such as liver tumors, breast tumors, etc., doctors use thermal ablation to heat the tumor or nodule tissue to 60° C.~80° C., causing local coagulation of the tumor or nodule tissue. The relevant characteristics of tumor or nodule tissue after necrosis are increased hardness, partial embrittlement, increased impedance value, hyperechoic appearance in ultrasound images, and appear as white shadows in ultrasound images. The thermal ablation includes two methods that are radiofrequency ablation (RFA) and microwave ablation (MWA). Radiofrequency ablation uses electric current to conduct heat indirectly, while microwave ablation uses high-frequency vibration of water molecules to generate heat.

To train doctors to perform thermal ablation, a simulated tumor prosthesis can currently be provided, allowing doctors to hold a thermal ablation tool and puncture the location of the simulated tumor prosthesis to practice thermal ablation operations. However, the currently known simulated tumor prostheses are made of gel-like materials. Such type of gel-like tumor prosthesis materials has the following shortcomings:

1. Gel-like tumor prosthesis materials have strict forming conditions. For example, they must be kept in an environment with a temperature of –20° C. for 24 to 50 hours before they can be formed. They cannot be formed at normal temperatures such as 27° C., and it is even more difficult to form quickly in a short time, which makes production extremely time-consuming.

2. When performing thermal ablation on a tumor prosthesis, the temperature of thermal ablation is usually between 60° C. and 80° C. At this range of temperature for thermal ablation, the tumor prosthesis made of gel will be hydrated. If the tumor prosthesis is needed to be cut open after thermal ablation for visually observing the degree of solidification or caramelization of the tumor prosthesis, the hydrated tumor prosthesis will dissipate and lose, and it is completely unable to simulate the solidification or caramelization of real tumor tissue after thermal ablation.

In addition, there are also known techniques that use completely solid materials to simulate tumor tissue. For example, the patent publication CN109694566A discloses a preparation method and application of a polyurethane rubber prosthesis material for ultrasonic puncture. The polyurethane rubber prosthesis material is analogous to human tissue, of which the main component is polyurethane rubber (urethane rubber) with Shore hardness (Shore A) of 10 to 60A, and its color can be adjusted by adding different toners. In the process of preparing polyurethane rubber prosthetic materials for ultrasonic puncture, activated carbon pellets of different sizes can be added to simulate tumor tissue in human tissue. Activated carbon pellets with strong ultrasound echo characteristics show clear gray-white images in B-mode ultrasound imaging, which are a good analogy to tumor tissue in human tissues in ultrasound imaging.

The above-mentioned patent publication CN109694566A uses polyurethane rubber prosthetic material to simulate human tissue and uses activated carbon pellets to simulate tumor tissue. However, because the hardness of activated carbon pellets is higher than that of real tumor tissue, the activated carbon pellets cannot simulate the touch of real tumor tissue during training. Furthermore, the disclosure of this patent publication is mainly for simulating ultrasonic imaging rather than for practicing thermal ablation. The disclosure of this patent publication uses activated carbon pellets to simulate tumor tissue. For thermal ablation operations, the hardness of the activated carbon pellets will not change before and after thermal ablation. Physicians cannot practice and master the thermal ablation temperature and the puncture position of thermal ablation, and observe the results of thermal ablation from the prosthesis disclosed in this patent publication.

In addition, the patent publication CN109694578A discloses a preparation method and application of an organic silicone prosthetic material for ultrasonic puncture. The organic silicone prosthetic material is analogous to human tissue. The main component of the organic silicone prosthetic material is highly transparent electronic potting organic silicone, of which the Shore hardness (Shore A) is 0 to 30 A, while the hardness can be adjusted by adding different amounts of silicone oil. In the process of preparing the organic silicone prosthetic material for ultrasonic puncture, transparent glass beads of different sizes can be added to simulate tumor tissue in human tissues. The organic silicone prosthetic material for ultrasonic puncture described in this disclosure has similar mechanical properties to human tissue and can be used for multiple ultrasonic punctures. Transparent glass beads with strong ultrasound echo characteristics show clear gray-white images in B-mode ultrasound imaging, which are a good analogy to tumor tissue in human tissues in ultrasound imaging.

The above-mentioned patent publication CN109694578A uses organic silicone prosthetic material to simulate human tissue and transparent glass beads to simulate tumor tissue. However, because the hardness of transparent glass beads is also higher than that of real tumor tissue, the transparent glass beads cannot simulate the touch of real tumor tissue during training. In addition, the disclosure of this patent publication is mainly for simulating ultrasonic imaging rather than for practicing thermal ablation. The disclosure of this patent publication uses transparent glass beads to simulate tumor tissue. For thermal ablation operations, the hardness of the transparent glass beads will not change before and after thermal ablation. Physicians also cannot practice and master the thermal ablation temperature and the puncture position of thermal ablation, and observe the results of thermal ablation from the prosthesis disclosed in this patent publication.

SUMMARY

In order to solve the problem that current simulated tumor prosthesis or simulated hyperplasia tissue prosthesis cannot be shaped at a temperature of 25° C. to 60° C., and also to solve the problem that current simulated tumor prosthesis or simulated hyperplasia tissue prosthesis cannot simulate protein properties and have a curing effect after thermal ablation. The present disclosure provides a method for manufacturing a lesion tissue prosthesis that simulates protein properties, which includes steps of: adding sodium carbonate and sodium polyacrylate to a first deionized water to obtain a first mixture, wherein the weight part of the first deionized water is 500 and the error value of the weight part of the first deionized water is within ±7%, the weight part of the sodium carbonate is 50 and the error value of the weight part of the sodium carbonate is within ±7%, and the weight part of the sodium polyacrylate is 200 and the error value of the weight part of the sodium polyacrylate is within ±7%; adding a cross-linking agent to the first mixture, and waiting for the cross-linking agent to be completely dissolved, wherein the weight part of the cross-linking agent is 150 and the error value of the weight part of the cross-linking agent is within ±7%; and adding an initiator and an accelerator to the first mixture, stirring to form a viscous colloid, and then shaping the viscous colloid to form a lesion tissue prosthesis, wherein the initiator comprises 30 weight parts of ammonium persulfate and 30 weight parts of a second deionized water, wherein the error value of the weight parts of the ammonium persulfate is within ±7%, the error value of the weight parts of the second deionized water is ±within 7%, wherein the accelerator is 40 weight parts of calcium acetate and the error value of the weight parts of the calcium acetate is within ±7%.

The above-mentioned cross-linking agent is N,N-methylene bisacrylamide or ethylene glycol dimethacrylate.

The above-mentioned initiator is formed by adding the ammonium persulfate to and completely dissolved in the second deionized water.

The above-mentioned lesion tissue prosthesis is shaped at a working temperature of 25° C. to 60° C.

The present disclosure also provides a lesion tissue prosthesis, which has the characteristics of simulating solidification of protein at high temperatures. The lesion tissue prosthesis includes: 500 weight parts of first deionized water, wherein the error value of the weight parts of the first deionized water is within ±7%; 50 weight parts of sodium carbonate, wherein the error value of the weight parts of the sodium carbonate is within ±7%; 200 weight parts of sodium polyacrylate, wherein the error value of the weight parts of the sodium polyacrylate is within ±7%; 200 weight parts of a cross-linking agent, wherein the error value of the weight parts of the cross-linking agent is within ±7%; 30 weight parts of ammonium persulfate, wherein the error value of the weight parts of the ammonium persulfate is within ±7%; 30 weight parts of a second deionized water, wherein the error value of the weight parts of the second deionized water is within ±7%; and 40 weight parts of calcium acetate, wherein the error value of the weight parts of the calcium acetate is within ±7%.

The above-mentioned cross-linking agent is N,N-methylene bisacrylamide or ethylene glycol dimethacrylate.

The present disclosure also provides a medical prosthesis, which includes a lesion tissue prothesis described above and a normal tissue prothesis, wherein the normal tissue prosthesis is an elastic colloid, and the normal tissue prosthesis covers or adheres to the lesion tissue prosthesis.

The above-mentioned normal tissue prosthesis includes 60 weight parts of polyvinyl alcohol (PVA), 600 weight parts of glycerol and 1404 weight parts of the third deionized water, and the error value of the weight parts of the polyvinyl alcohol is within ±7%, the error value of the weight parts of the glycerol is within ±7%, and the error value of the weight parts of the third deionized water is within ±7%.

The above-mentioned normal tissue prosthesis further includes 2 weight parts of an aqueous dye, and the error value of the weight parts of the aqueous dye is within ±7%.

Based on the above technical characteristics, the following effects can be achieved:

1. The lesion tissue prosthesis manufactured by the present disclosure can be freely shaped in an environment with a temperature of 25° C. to 60° C., and can be formed into a soft elastomer within 24 hours. If the working temperature of the shaping is increased, for example, at a temperature of 50° C., shaping can be completed within 15 minutes, making the production extremely fast.

2. The medical prosthesis manufactured by the present disclosure includes a normal tissue prosthesis and a lesion tissue prosthesis, wherein the normal tissue prosthesis covers or adheres to the lesion tissue prosthesis. When performing thermal ablation surgery practice, the lesion tissue prosthesis will not hydrate but will solidify with the temperature of thermal ablation to simulate protein properties. This is the same as the solidification result of tumor tissue during real thermal ablation surgery that the solidified lesion tissue prosthesis can present a realistic white shadow under ultrasound. Even after the thermal ablation surgery practice is completed, the medical prosthesis according to the present disclosure can also be cut open and visually observed whether the lesion tissue prosthesis is solidified or caramelized, thereby evaluating whether the execution position of thermal ablation is correct, whether the number of times of thermal ablation is appropriate, whether the execution temperature of thermal ablation is appropriate, etc., as references for improving thermal ablation operations.

3. As the temperature of thermal ablation increases, the impedance of the lesion tissue prosthesis manufactured by the present disclosure can also increase. When performing thermal ablation surgery practice, the impedance of the lesion tissue prosthesis can be measured at any time, so that the thermal ablation surgical equipment can timely control the temperature of thermal ablation, or issue a timely high temperature warning for thermal ablation operations.

BRIEF DESCRIPTION OF DRAWINGS

FIG. 1 is a schematic flow chart of the method for manufacturing a lesion tissue prosthesis that simulates protein properties according to the present disclosure.

FIG. 2 is a schematic diagram of the production of the lesion tissue prosthesis of the present disclosure.

FIG. 4 is a schematic diagram of thermal ablation operation performed on a medical prosthesis according to the present disclosure.

FIG. 5A is an ultrasound image before thermal ablation operation is performed on a medical prosthesis of the present disclosure.

FIG. 5B is an ultrasonic image after performing thermal ablation operation on a medical prosthesis of the present disclosure, and the image shows the high echo of a diseased tissue prosthesis.

FIG. 6 is a diagram showing the relationship between temperature and impedance during thermal ablation of the lesion tissue prosthesis of the present disclosure.

FIG. 7 is a diagram of an embodiment of a medical prosthesis of the present disclosure for the breast.

FIG. 8 is a diagram of an embodiment of a medical prosthesis of the present disclosure for the prostate.

DETAILED DESCRIPTIONS OF EMBODIMENTS

Figure 3:
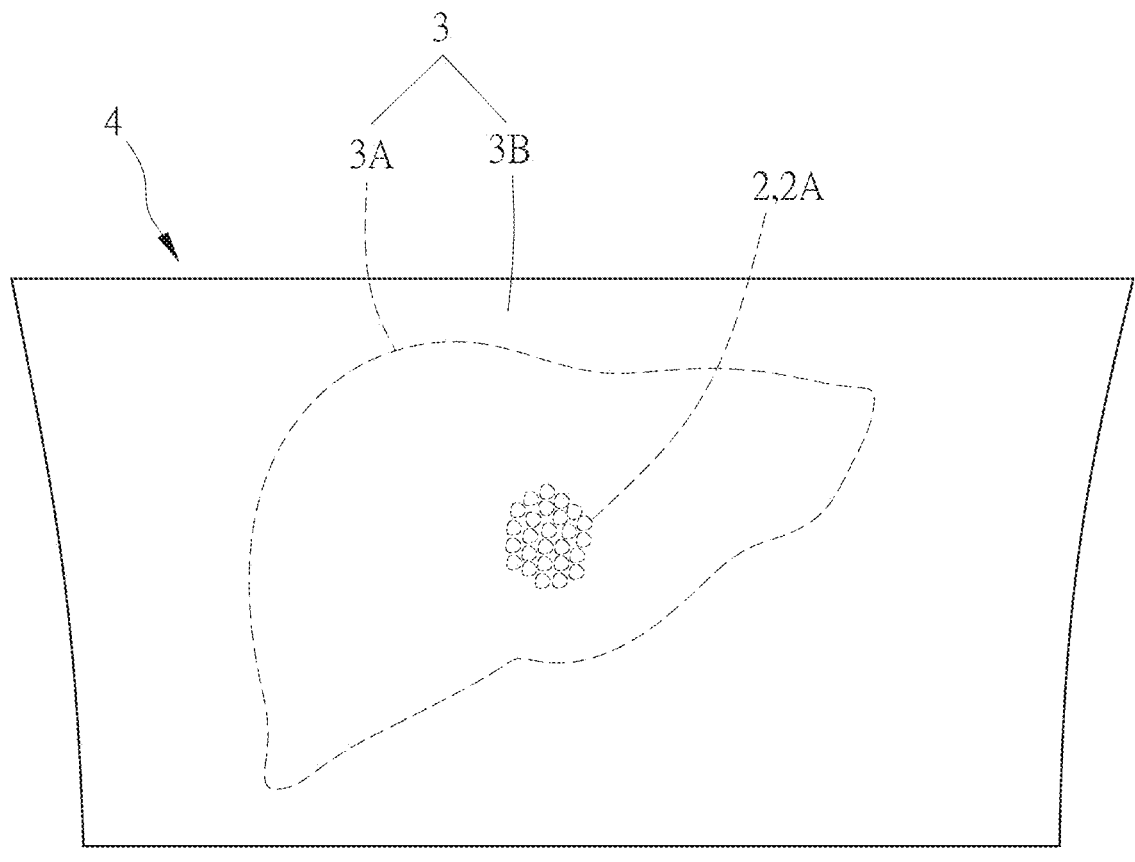
FIG. 3 is a schematic diagram of a medical prosthesis of the present disclosure, which simulates the human abdomen, human liver and liver tumors.

Based on the above technical features, the main features of a method for manufacturing a lesion tissue prosthesis that simulates protein properties, a lesion tissue prosthesis and a medical prosthesis according to the present disclosure will be clearly demonstrated in the following embodiments. A lesion tissue prosthesis referred to in the present disclosure may be a tumor prosthesis, a nodule prosthesis, a cyst prosthesis, a polyp prosthesis or other cell proliferation tissue prosthesis, etc. The lesion tissue prosthesis is shaped to form a soft elastomer at room temperature of 25° C. to 60° C., and can simulate protein properties to be solidified at a temperature of 60° C. to 80° C. during thermal ablation. A medical prosthesis referred to in the present disclosure refers to a comprehensive prosthesis including a normal tissue prosthesis and the above-mentioned lesion tissue prosthesis. The medical prosthesis simulates the appearance of normal tissue covering tumors in animals or humans. The above-mentioned medical prosthesis can be produced via recon- structing the image into a three-dimensional figure based on medical images such as computed tomography images, followed by using three-dimensional printing or molding methods. A medical prosthesis that can be implemented according to the present disclosure includes breast tumor prosthesis, liver tumor prosthesis, prostatic hyperplasia tis- sue prosthesis, etc. The term "weight part" mentioned in the following examples according to the present disclosure refers to a weight unit, such as milligrams, grams, ounces, pounds, Taiwanese mace, Taiwanese catty, Taiwanese tael, kilograms, tons, etc. The weight parts of all components referred to in the examples are the same unit, such as all in grams or all in kilograms, the weight parts listed are only used to indicate the weight proportion of all components respectively. The weight parts of all components can be increased or decreased in equal proportions according to the values described in the examples.

Referring to FIG. 1 and FIG. 2, a method for manufac- turing a lesion tissue prosthesis that simulates protein prop- erties according to the present disclosure includes the fol- lowing steps:

Sodium carbonate 12 and sodium polyacrylate 13 are added into a first deionized water 11 to obtain a first mixture 14, wherein the weight part of the first deionized water 11 is 500 and the error value of the weight part of the first deionized water 11 is within ±7%, the weight part of the sodium carbonate 12 is 50 and the error value of the weight part of the sodium carbonate 12 is within ±7%, and the weight part of the sodium polyacrylate 13 is 200 and the error value of the weight part of the sodium polyacrylate 13 is within ±7%.

Next, a cross-linking agent 15 is added into the first mixture 14, and waiting for the cross-linking agent 15 to be completely dissolved. The cross-linking agent 15 is 150 weight parts of N,N-methylenebisacrylamide or 150 weight parts of ethylene glycol dimethacrylate. The error value of the weight part of the N,N-methylenebisacrylamide is within ±7%. The error value of the weight part of the ethylene glycol dimethacrylate is within ±7%.

An initiator 16 is prepared. The initiator 16 includes 30 weight parts of ammonium persulfate and 30 weight parts of a second deionized water (not shown in the drawings). The error value of the weight parts of the ammonium persulfate is within ±7%. The error value of the weight part of the second deionized water is within ±7%. The ammonium persulfate is added to the second deionized water to com- pletely dissolved in the ammonium persulfate. The second deionized water can also be replaced with the same weight part of pure water or tap water.

The initiator 16 and an accelerator 17 are added into the above-mentioned first mixture 14, and then stirred to form a viscous colloid. The colloid is then shaped into a lesion tissue prosthesis 2 composed of a soft elastomer. The lesion tissue prosthesis 2 has the characteristic of simulating pro- tein properties and can be shaped at a temperature of 25° C. to 60° C. Among them, the accelerator 17 is 40 weight parts of calcium acetate, and the error value of the weight parts of calcium acetate is within ±7%.

The above-mentioned lesion tissue prosthesis 2 that simu- lates protein properties can be shaped at a working tempera- ture of 25° C. to 60° C. Increasing the working temperature can reduce the shaping time. For example, at a working temperature of 27° C., shaping can be completed in 24 hours, while at working temperature of 50° C. shaping can be completed in just 15 minutes. If the precise shape of the lesion tissue prosthesis 2 is not particularly required, the shaping can be quickly completed by continuously kneading the aforementioned colloid with hands at a working tem- perature of 40° C. to 50° C. As shown in FIG. 2, in order to mass-produce the lesion tissue prosthesis 2 of a specific shape, a mold 21 can be used to make the lesion tissue prosthesis 2 of any shape. The mold 21 can be, for example, a silicone mold, a metal mold, a plastic mold or the like. In this embodiment, the mold 21 is a silicone mold including a lower mold 21A and an upper mold 21B. The lower mold 21A is provided with a plurality of hemispherical lower mold cavities 211A. The upper mold 21B is provided with the same number of hemispherical upper mold cavities 211B as that of the lower mold cavities 211A, and each of the upper mold cavities 211B has an exhaust hole 212B extend- ing therethrough. The four corners of the lower mold 21A and the upper mold 21B are respectively provided with grooves 213A and protrusions 213B for aligning with each other. During shaping, the lower mold 21A and the upper mold 21B are placed flatly first, the openings of the lower mold cavities 211A and the upper mold cavities 211B facing upward. The lower mold cavities 211A and the upper mold cavities 211B are filled with the viscous colloid respectively, and then the lower mold 21A and the upper mold 21B are aligned and capped by each other. During the capping process, due to the high viscosity of the viscous colloid, the viscous colloid will not flow out of the lower mold cavities 211A and the upper mold cavities 211B. Also, when the lid is closed, the gas can be discharged from the exhaust hole 212B. The viscous colloid is bonded in the lower mold cavities 211A and the upper mold cavities 211B and formed into a sphere. After the shaping is completed, the lower mold 21A and the upper mold 21B are opened, and the lesion tissue prosthesis 2 which is a soft elastomer is taken out. Preferably, the lesion tissue prosthesis 2 is made based on the three-dimensional figure which is first constructed by the patient's tomographic scan image.

Referring to FIG. 3, in addition, a normal tissue prosthesis 3 is made with an elastic colloid. The normal tissue prosthesis 3 covers or adheres to the lesion tissue prosthesis 2 to form a medical prothesis 4. The above-mentioned normal tissue prosthesis 3 includes 60 weight parts of polyvinyl alcohol (PVA), 600 weight parts of glycerol, and 1404 weight parts of the third deionized water. The error value of the weight parts of the polyvinyl alcohol is within ±7%. The error value of the weight parts of the glycerol is within ±7%. The error value of the weight parts of the third deionized water is within ±7%. The third deionized water can also be replaced with the same weight part of pure water or tap water. The normal tissue prosthesis 3 can be molded, and freezing and thawing operations are performed during the shaping process to assist in the molding of the normal tissue prosthesis 3. The embodiment includes two types of tissue prostheses. One is a liver prosthesis (3A), and the other is an abdominal prosthesis (3B). The abdominal prosthesis 3B covers the liver prosthesis 3A. The abdominal prosthesis 3B and the liver prosthesis 3A are respectively mixed with aqueous dyes of different colors. For example, the aqueous dye for abdominal prosthesis 3B is skin color, and the aqueous dye for liver prosthesis 3A is red, in order to improve the realism. In addition, the lesion tissue prosthesis 2 of this embodiment is a liver tumor prosthesis 2A, and the liver tumor prosthesis 2A is covered in the above-mentioned liver prosthesis 3A. The medical prosthesis 4 referred to in the present disclosure includes a normal tissue prosthesis 3 and a lesion tissue prosthesis 2. In this embodiment, the liver prosthesis 3A covers the liver tumor prosthesis 2A to form a medical prosthesis 4 as referred to in the present disclosure. The abdominal prosthesis 3B covers the liver prosthesis 3A, and the liver prosthesis 3A then covers the liver tumor prosthesis 2A. This type of composite-covered comprehensive prosthesis is also a medical prosthesis 4 referred to in the present disclosure.

Referring to FIG. 4, the medical prosthesis 4 of this embodiment includes a normal tissue prosthesis 3 and a lesion tissue prosthesis 2. The normal tissue prosthesis 3 is the liver prosthesis 3A and the abdominal prosthesis 3B, while the lesion tissue prosthesis 2 is the liver tumor prosthesis 2A. When performing a thermal ablation practice on the medical prosthesis 4, the ultrasonic probe 5 is attached to the abdominal prosthesis 3B and pointed at the liver prosthesis 3A to obtain an ultrasonic image of the liver prosthesis 3A. In addition, in conjunction with the ultrasound image, the thermal ablation needle 6 is used to penetrate the abdominal prosthesis 3B and the liver prosthesis 3A to the liver tumor prosthesis 2A, and the thermal ablation needle 6 is used to perform a thermal ablation operation on the liver tumor prosthesis 2A. During the operations, depending on the size and number of the liver tumor prostheses 2A, the thermal ablation operation may require multiple punctures and multiple thermal ablations until all the liver tumor prostheses 2A are thermally ablated and solidified.

Referring to FIG. 5A, the medical prosthesis 4 of the present disclosure is scanned with ultrasound. Before the thermal ablation operation is performed on the medical prosthesis 4, the lesion tissue prosthesis 2 and the normal tissue prosthesis 3 can be seen from the ultrasound image. Referring to FIGS. 5A and 5B, after thermal ablation is performed, the thermally ablated and solidified lesion tissue prosthesis 2 appears hyperechoic in the ultrasound image, and a white shadow 2B appears in the ultrasound image.

In FIG. 4, since the force and direction of the ultrasonic probe 5 will affect the performance of the ultrasonic images, there may be errors in determining the results of the thermal ablation based solely on the high echo of the ultrasonic image. The liver tumor prosthesis 2A of the present disclosure can simulate the solidification phenomenon of protein at 60° C. to 80° C. When performing the thermal ablation practice, not only instantly obtaining the hyperechoic effect of the ultrasound image during the execution to evaluate the effectiveness of the practice, but also the liver prosthesis 3A can also be taken out and cut open and directly visually observed the degree of solidification of the liver tumor prosthesis 2A to evaluate whether there are incomplete solidification after the thermal ablation practice is completed, and then comparing it with the ultrasound image to obtain a more accurate evaluation result, which can be used as a reference for future practice. Compared with the conventional gel-type liver tumor prosthesis, because the gel does not have the characteristic of simulating solidification of protein at 60° C. to 80° C., once the conventional liver prosthesis is cut open after the thermal ablation practice, the gel-type liver tumor prosthesis will appear hydrated and dissipate, and it is impossible to visually observe the results of the thermal ablation of the conventional liver tumor prosthesis. The liver tumor prosthesis 2A of the present disclosure can simulate the solidification phenomenon of protein at 60° C. to 80° C. when performing thermal ablation operations, whether radiofrequency ablation (RFA) or microwave ablation (MWA) is used, and the higher the temperature, the higher the hardness of the solidification. If the temperature of the thermal ablation exceeds 80° C., caramelization may also occur.

Referring to FIG. 6, during the thermal ablation operation, as the temperature of the thermal ablation increases, the impedance of the lesion tissue prosthesis 2 of the present disclosure (not shown in FIG. 6) will also increase. The X-axis in FIG. 6 represents the temperature, and the Y-axis represents the impedance. It is shown in this figure that as the temperature of the thermal ablation increases, the impedance of the lesion tissue prosthesis 2 also increases. When the temperature of the thermal ablation is 60° C., the value of the impedance is about 100 ohms. When the thermal ablation temperature is 80° C., the value of the impedance is about 1100 ohms. For thermal ablation equipment equipped with a warning device, the impedance changes of the lesion tissue prosthesis 2 can be detected at any time, and when the impedance reaches a certain preset value, the thermal ablation equipment sends a warning signal or interrupts the current, so that the thermal ablation operation is as expected.

As shown in FIG. 4, the present disclosure also discloses a lesion tissue prosthesis 2 that can be shaped to form a soft elastomer in an environment with a temperature of 25° C. to 60° C., and has the characteristic of simulating solidification of protein at a temperature of 60° C. to 80° C. as well as caramelization of protein at more than 80° C. The lesion tissue prosthesis 2 includes 500 weight parts of first deionized water, 50 weight parts of sodium carbonate, 200 weight parts of sodium polyacrylate, 200 weight parts of a cross-linking agent, 30 weight parts of ammonium persulfate, 30 weight parts of a second deionized water, and 40 weight parts of calcium acetate. The error value of the weight parts of the first deionized water is within ±7%. The error value of the weight parts of the sodium carbonate is within ±7%. The error value of the weight parts of the sodium polyacrylate is within ±7%. The error value of the weight parts of the cross-linking agent is within ±7%. The error value of the parts by weight is within ±7%. The error value of the weight parts of the second deionized water is within ±7%. The error value of the weight parts of the calcium acetate is within ±7%. The cross-linking agent is N,N-methylene bisacrylamide or ethylene glycol dimethacrylate. The first deionized water can be replaced with the same weight part of pure water or tap water, and the second deionized water can also be replaced with the same weight part of pure water or tap water.

Referring to FIG. 4, a medical prothesis 4 is also disclosed according to the present disclosure. The normal tissue prosthesis 3 is an elastic colloid. The normal tissue prosthesis 3 covers or adheres to the lesion tissue prosthesis 2. The above-mentioned normal tissue prosthesis 3 includes 60 weight parts of polyvinyl alcohol (PVA), 600 weight parts of glycerol, and 1404 weight parts of the third deionized water, and further includes 2 weight parts of an aqueous dye. The error value of the weight parts of the polyvinyl alcohol is within ±7%. The error value of the weight parts of the glycerol is within ±7%. The error value of the weight parts of the third deionized water is within ±7%. The error value of the weight parts of the aqueous dye is within ±7%. The third deionized water can also be replaced with the same weight part of pure water or tap water.

Referring to FIG. 7, in the medical prothesis 4 of the present disclosure, the normal tissue prosthesis 3 can be a breast prosthesis 3C, and the lesion tissue prosthesis 2 can be a breast tumor prosthesis 2C.

Referring to FIG. 8, in the medical prothesis 4 of the present disclosure, the normal tissue prosthesis 3 can be a bladder prosthesis 3E or a prostate prosthesis 3F, and the lesion tissue prosthesis 2 can be a prostate tumor prosthesis 2E.

In addition to the above-mentioned prostheses, other prostheses that simulate human tissue and are combined with tumors and suitable for performing thermal ablation are all feasible embodiments of the present disclosure.

Based on the description of the above embodiments, the operation, use and effects of the present disclosure can be fully understood. However, the above embodiments are only preferred embodiments of the present disclosure and should not be used to limit the implementation of the present disclosure. The scope, that is, simple equivalent changes and modifications based on the claims and the description of the present disclosure, are all within the scope of the present disclosure.

What is claimed is:

1. A method for manufacturing a lesion tissue prosthesis that simulates protein properties, comprising steps of:

adding sodium carbonate and sodium polyacrylate to a first deionized water to obtain a first mixture, wherein the weight part of the first deionized water is 500 and the error value of the weight part of the first deionized water is within ±7%, the weight part of the sodium carbonate is 50 and the error value of the weight part of the sodium carbonate is within ±7%, and the weight part of the sodium polyacrylate is 200 and the error value of the weight part of the sodium polyacrylate is within ±7%;

adding a cross-linking agent to the first mixture, and waiting for the cross-linking agent to be completely dissolved, wherein the weight part of the cross-linking agent is 150 and the error value of the weight part of the cross-linking agent is within ±7%; and adding an initiator and an accelerator to the first mixture, stirring to form a viscous colloid, and then shaping the viscous colloid to form a lesion tissue prosthesis, wherein the initiator comprises 30 weight parts of ammonium persulfate and 30 weight parts of a second deionized water, wherein the error value of the weight parts of the ammonium persulfate is within ±7%, the error value of the weight parts of the second deionized water is ± within 7%, wherein the accelerator is 40 weight parts of calcium acetate and the error value of the weight parts of the calcium acetate is within ±7%.

2. According to the method as claimed in claim 1, wherein the cross-linking agent is N,N-methylene bisacrylamide or ethylene glycol dimethacrylate.

3. According to the method as claimed in claim 1, wherein the initiator is formed by adding the ammonium persulfate to and completely dissolved in the second deionized water.

4. According to the method as claimed in claim 1, wherein the lesion tissue prosthesis is shaped at a working temperature of 25° C. to 60° C.

5. A lesion tissue prosthesis that simulates protein properties manufactured using the method according to claim 1, comprising:

500 weight parts of first deionized water, wherein the error value of the weight parts of the first deionized water is within ±7%;

50 weight parts of sodium carbonate, wherein the error value of the weight parts of the sodium carbonate is within ±7%;

200 weight parts of sodium polyacrylate, wherein the error value of the weight parts of the sodium polyacrylate is within ±7%;

200 weight parts of a cross-linking agent, wherein the error value of the weight parts of the cross-linking agent is within ±7%;

30 weight parts of ammonium persulfate, wherein the error value of the weight parts of the ammonium persulfate is within ±7%;

30 weight parts of a second deionized water, wherein the error value of the weight parts of the second deionized water is within ±7%; and 40 weight parts of calcium acetate, wherein the error value of the weight parts of the calcium acetate is within ±7%.

6. According to the lesion tissue prosthesis as claimed in claim 5, wherein the cross-linking agent is N,N-methylene bisacrylamide or ethylene glycol dimethacrylate.

7. According to the lesion tissue prosthesis as claimed in claim 5, wherein the initiator is formed by adding the ammonium persulfate to and completely dissolved in the second deionized water.

8. According to the lesion tissue prosthesis as claimed in claim 5, wherein the lesion tissue prosthesis is shaped at a working temperature of 25° C. to 60° C.

9. A medical prosthesis, comprising a lesion tissue prosthesis according to claim 5 and a normal tissue prothesis, wherein the normal tissue prosthesis is an elastic colloid, and the normal tissue prosthesis covers or adheres to the lesion tissue prosthesis.

10. According to the medical prothesis as claimed in claim 9, wherein the normal tissue prosthesis comprises 60 weight parts of polyvinyl alcohol (PVA), 600 weight parts of glycerol and 1404 weight parts of the third deionized water, and the error value of the weight parts of the polyvinyl alcohol is within ±7%, the error value of the weight parts of the glycerol is within ±7%, and the error value of the weight parts of the third deionized water is within ±7%.

11. According to the medical prothesis as claimed in claim 9, wherein the normal tissue prosthesis further comprises 2 weight parts of an aqueous dye, and the error value of the weight parts of the aqueous dye is within ±7%.

12. According to the medical prothesis as claimed in claim 9, wherein the cross-linking agent is N,N-methylene bisacrylamide or ethylene glycol dimethacrylate.

13. According to the medical prosthesis as claimed in claim 9, wherein the initiator is formed by adding the ammonium persulfate to and completely dissolved in the second deionized water.

14. According to the medical prosthesis as claimed in claim 9, wherein the lesion tissue prosthesis is shaped at a working temperature of 25° C. to 60° C.

\*　\*　\*　\*　\*